(12) United States Patent
Vogt (10) Patent No.: US 9,587,174 B2
(45) Date of Patent: Mar. 7, 2017

(54) NA$_3$WO$_4$F AND DERIVATIVES THEREOF AS A SCINTILLATION MATERIAL AND THEIR METHODS OF MAKING

(71) Applicant: Thomas Vogt, Chapin, SC (US)

(72) Inventor: Thomas Vogt, Chapin, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 14/374,653

(22) PCT Filed: Jan. 24, 2013

(86) PCT No.: PCT/US2013/022949
§ 371 (c)(1),
(2) Date: Jul. 25, 2014

(87) PCT Pub. No.: WO2013/112718
PCT Pub. Date: Aug. 1, 2013

(65) Prior Publication Data
US 2015/0014585 A1 Jan. 15, 2015

Related U.S. Application Data

(60) Provisional application No. 61/590,368, filed on Jan. 25, 2012.

(51) Int. Cl.
*C09K 11/08* (2006.01)
*C09K 11/77* (2006.01)
*C09K 11/68* (2006.01)
*G21K 4/00* (2006.01)

(52) U.S. Cl.
CPC ........ *C09K 11/7736* (2013.01); *C09K 11/681* (2013.01); *C09K 11/684* (2013.01); *C09K 11/7722* (2013.01); *G21K 4/00* (2013.01); *G21K 2004/06* (2013.01)

(58) Field of Classification Search
CPC .. C09K 11/7736; C09K 11/7722; C09K 11/68
See application file for complete search history.

(56) References Cited

U.S. PATENT DOCUMENTS

| | | | |
|---|---|---|---|
| 3,177,156 A | 4/1965 | Soden et al. | |
| 5,273,732 A | 12/1993 | Srivastava et al. | |
| 5,625,202 A | 4/1997 | Chai | |
| 6,585,913 B2 | 7/2003 | Lyons et al. | |
| 2009/0174310 A1 | 7/2009 | Vogt et al. | |
| 2009/0302236 A1 | 12/2009 | Vogt et al. | |

OTHER PUBLICATIONS

Chemical abstract citation 1952:47847, 1951.*

(Continued)

*Primary Examiner* — Carol M Koslow
(74) *Attorney, Agent, or Firm* — Dority & Manning, P.A.

(57) ABSTRACT

Direct synthesis methods are generally provided that include reacting Na$_2$(WO$_4$)·2H$_2$O (and/or Na$_2$(GeO$_4$)·2H$_2$O) with NaF in an inert atmosphere at a reaction tion temperature of about 950° C. to about 1400° C., along with the resulting structures and compositions.

18 Claims, 7 Drawing Sheets

(56) References Cited

OTHER PUBLICATIONS

Schmitz-Dumont et al, "The influence of the cation radium on the energy of formation of addition compounds. III. The systems alkali fluoride-alkali chronate, molybdate, and tungstate", Zeitschrift fuer Anorganische und Allgemeine Chemie, (1951), 265, pp. 139-155.*
Search Report for corresponding Application No. PCT/US2013/022949 dated Mar. 29, 2013, 2 pages.

* cited by examiner

$Na_3WO_4F$ AND DERIVATIVES THEREOF AS A SCINTILLATION MATERIAL AND THEIR METHODS OF MAKING

PRIORITY INFORMATION

The present application claims priority to U.S. Provisional Patent Application Ser. No. 61/590,368 of Thomas Vogt titled "$Na_3WO_4F$ and Derivatives Thereof as a Scintillation Material and Their Methods of Making" filed on Jan. 25, 2012, the disclosure of which is incorporated herein by reference.

BACKGROUND

Scintillator materials are used to detect γ-rays, x-rays, neutrons and electrons in research and medical imaging devices. Furthermore, high-energy and nuclear physics relies on scintillation to detect weakly interacting particles and energies such as dark matter and dark energy. Some of the basic requirements for scintillator materials are: (1) a fast response time in the range of 10-100 ns for time-resolution, (2) a high light yield in excess of tens of thousands of photons per absorbed radiation particle, (3) a high density p and atomic number for efficient y-ray detection, since the latter is proportional to $\rho Z^{3-4}$, (4) good match of the scintillation output with the sensitivity of light sensor (i.e. photomultiplier tube), and (5) availability of large single crystals. Early scintillation materials to detect radiation were $K_2Pt(CN)_4$ and $CaWO_4$ introduced in 1895 by Roentgen and in 1896 by Becquerel. $CaWO_4$ converts x-rays into blue light and was used early on for x-ray photography and medical imaging. The light yield ($Y_{hv}$) of scintillators given in photons/MeV can be approximated by a simple formula: $Y_{hv}=[10^6/\beta E_g]$ S QE, with β being a materials dependent constant (2.5 for halides), $E_g$ the band gap of the host lattice, S the energy transfer efficiency from the host lattice to the activator and QE the quantum efficiency of the activator. The product of $\beta E_g$ is the energy required to produce one exciton. To maximize light yield S and QE must be close to 100% and $E_g$ small.

The two main techniques used in medical imaging are X-ray tomography and positron emission tomography (PET). In X-ray tomography, radioisotopes are injected into the body by administering compounds containing radioactive isotope such as $^{99}Tc$. The emitted radiation in the 120-150 keV energy range is then detected using a scintillator material. By appropriate camera rotations around the patient and the use of multiple detectors mathematical algorithms are used to reconstruct a three-dimensional image of the biological entity investigated. Modern computer tomography (CT) scanners use thousands of individual X-ray detectors spaced about 1 mm apart. Scintillators used for CT are $(Y,Gd)_2O_3:Eu^{3+}$, $Gd_2O_2S:Pr^{3+}$ and $CdWO_4$. The emissions are at 612 nm due to a $^5D_0 \rightarrow {}^7F_2$ transition in $(Y,Gd)_2O_3:Eu^{3+}$ and 510 nm due to a $^3P_0 \rightarrow {}^3H_2, {}^3F_3$ transition in $Gd_2O_2S:Pr^{3+}$. The 480 nm emission in $CdWO_4$ is a charge transfer transition. The various tungstates $AWO_4$ (A=Ca, Ba, Cd, Zn) adopting the scheelite structure are also widely used scintillator materials. Again a strongly distorted excited state that differs significantly from the ground state leads to the emission of a broad-band with a large Stokes shift. The $Cd^{2+}4d$ electronic states are located near the bottom of the valence band which is formed by the oxygen 2p orbitals. The conduction band has mainly W 5d character. The scintillator properties of this material are based on the $WO_4^{2-}$ entities and can be rationalized as resulting from the charge transfer out of the $O^{2-}2p$ states into $W^{6+}5d^0$ states with contributions from $Cd^{2+}4d$ states. In these tungstates thermal quenching at room temperature is usually very small and quantum efficiencies of up to 70% can be achieved. Using a simple approximation for the energy efficiency of scintillator materials developed above a theoretical conversion efficiency of 6% can be calculated. Experimental values of 3.5% have been found. The light yields of all these scintillators are moderate and produce about 10,000 photons/MeV.

In PET, the annihilation of positrons is exploited for imaging purposes. The predominantly used positron emitters are the isotopes of $^{11}C$ ($t_{1/2}$~20 min), $^{13}N$ ($t_{1/2}$~10 min, $^{15}O$ ($t_{1/2}$~2 min) and $^{18}F$ ($t_{1/2}$~110 min). Due to their positive charge and strong interaction with matter, the emitted positrons are stopped in biological tissue after traveling just a few millimeters. When slowing down, positrons will annihilate with electrons in condensed matter and emit in most cases two γ-rays in opposite directions which both have energies of 511 keV. PET makes use of this collinear emission of two γ-rays by measuring the temporal coincidence data along straight lines. This also permits the reconstruction of 3-dimensional biological objects using appropriate algorithms. $Bi_4Ge_3O_{12}$(BGO) crystals are used in PET scanners as scintillator materials. The structure of $Bi_4Ge_3O_{12}$ consists of isolated $GeO_4$ tetrahedrons and $Bi^{3+}$ ions which have an asymmetric coordination with three short (2.16 Å) and three long (2.60 Å) Bi-oxygen distances as a consequence of the $6s^2$ lone pair electronic configuration. In the excited state, this coordination is more symmetric. However, this material has high thermal quenching and at room temperature about ⅔ of the light efficiency of BGO is quenched. The experimental value of the energy efficiency of BGO is about 2%. The density of BGO is 7.1 g/cm$^3$ and its effective Z with 75 is very high. The Stokes shift is quite large with 14,000 cm$^{-1}$ which minimizes self-absorption and allows thin slabs to be used as detectors since the crystal is transparent to its emission light at 480 nm.

$NaI:Tl^+$ is another commonly scintillator material used in PET and as an x-ray phosphor. Its density is about half of that of $Bi_4Ge_3O_{12}$(3.86 g/cm$^3$) and its $Z_{eff}$ is 51. With a light yield of about 40,000 photons/MeV, a decay time of 230 ns, non-proportionality of the light yield in the 60-1275 keV range and hygroscopic behavior requiring the crystals to be sealed one would not give this material a big chance for market penetration. However, easy and low cost manufacturing have provided economic opportunities despite rather mediocre technical specifications.

As such, a need exists for improved scintillator materials.

SUMMARY

Objects and advantages of the invention will be set forth in part in the following description, or may be obvious from the description, or may be learned through practice of the invention.

Direct synthesis methods are generally provided that include reacting $Na_2(WO_4) \cdot 2H_2O$ (and/or $Na_2(GeO_4) \cdot 2H_2O$) with NaF in an inert atmosphere at a reaction temperature of about 950° C. to about 1400° C., along with the resulting structures and compositions. In one embodiment, $Na_2(WO_4) \cdot 2H_2O$ can be reacted with NaF according to the reaction:

where 0≤x≤0.2 (e.g., 0<x≤0.2) and M is B, Al, Si, P, S, Cr, V, Nb, Ta, Zr, Hf, Sc, Y, La, Ga, Ge, In, Mo, or combinations thereof.

For instance, x can be 0 such that $Na_3(WO_4)F$ is formed according to one particular embodiment. According to this method, $Na_3WO_4F$ can be formed into single crystals having an impurity concentration present at a concentration of less than about 500 ppb (e.g., less than about 100 ppb). In another embodiment, 0<x≤0.2 and M is Mo such that $Na_3W_{1-x}Mo_xO_4F$ is formed.

A crystal structure comprising $Na_3(WO_4)F$ with impurities present in a concentration of less than about 500 ppb (e.g., less than about 100 ppb) is also provided.

A composition of matter is also generally provided that has the formula:

$$Na^+{}_{3-a-2b-3c}A^+{}_aB^{2+}{}_bC^{3+}{}_cW_{1-x}M_xO_4F$$

where 0≤a≤2; $A^+$ is an alkali metal ion; 0≤b≤1; $B^{2+}$ is an alkaline earth metal ion selected from $Be^{2+}$, $Mg^{2+}$, $Ca^{2+}$, $Sr^{2+}$, and/or $Ba^{2+}$, a rare earth divalent cation from the atomic numbers 57-71, an activator cation of Cr, Mn, Re, Cu, Ag, Au, Zn, Cd, Hg, Sn, or any combinations thereof; 0≤c≤1; $C^{3+}$ is an, a rare earth cation from the atomic numbers 57-71, an activator cation of Ac, U, Cr, Mn, As, Sb, Bi, In, Tl, or any combinations thereof; 0≤x≤0.2; and M is B, Al, Si, P, S, Cr, V, Nb, Ta, Zr, Hf, Sc, Y, La, Ga, Ge, In, Mo, or combinations thereof. This material can have an impurity concentration present at a concentration of less than about 500 ppb.

For example, in one embodiment, a=b=c=0 such that the composition of matter has the formula:

$$Na_3(W_{1-x}M_xO_4)F,$$

where 0≤x≤0.2, and M is B, Al, Si, P, S, Cr, V, Nb, Ta, Zr, Hf, Sc, Y, La, Ga, Ge, In, Mo, or combinations thereof. X can be 0, or 0≤x≤0.2.

In another embodiment, a is 0; b is 0; 0≤c≤0.1; C is Ce, Eu, or a combination thereof; and 0≤x≤0.2.

A crystal structure is also provided that comprises $Na_3(GeO_4)F$ with impurities present in a concentration of less than about 500 ppb.

Scintillator material and phosphor materials comprising the composition and/or crystal structure of any of these materials are also generally provided.

Other features and aspects of the present invention are discussed in greater detail below.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Chemical elements are discussed in the present disclosure using their common chemical abbreviation, such as commonly found on a periodic table of elements. For example, hydrogen is represented by its common chemical abbreviation H, helium is represented by its common chemical abbreviation He; and so forth.

$Na_3WO_4F$ and its derivatives are generally provided as new scintillation materials for use in medical imaging and the detection of particles and energies including, y-rays, x-rays, neutrons, neutrinos and weakly interaction massive particles (WIMPS). For example, derivatives of $Na_3WO_4F$ can include a substituted material(s) in a portion of the tungsten (W) locales (e.g., $Na_3(W_{1-x}M_xO_4)F$, where 0≤x≤0.2 and M is B, Al, Si, P, S, Cr, V, Nb, Ta, Zr, Hf, Sc, Y, La, Ga, Ge, In, Mo, or combinations thereof).

1. Crystal Structure of $Na_3WO_4F$ and its Derivatives

Figure 1A:
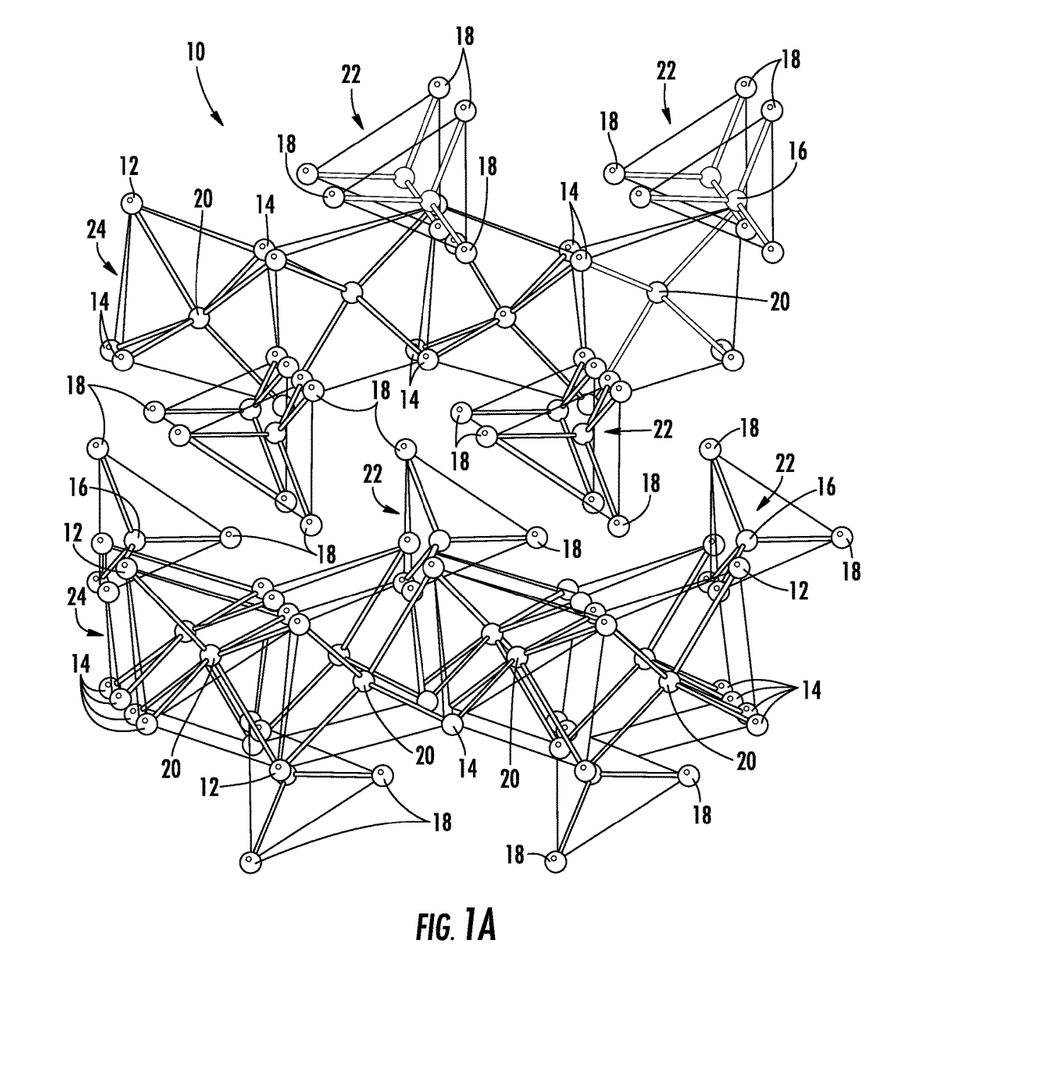
FIGS. 1A and 1B show a diagram representation of the crystal structure of $Na_3(WO_4)F$.
Figure 1B:
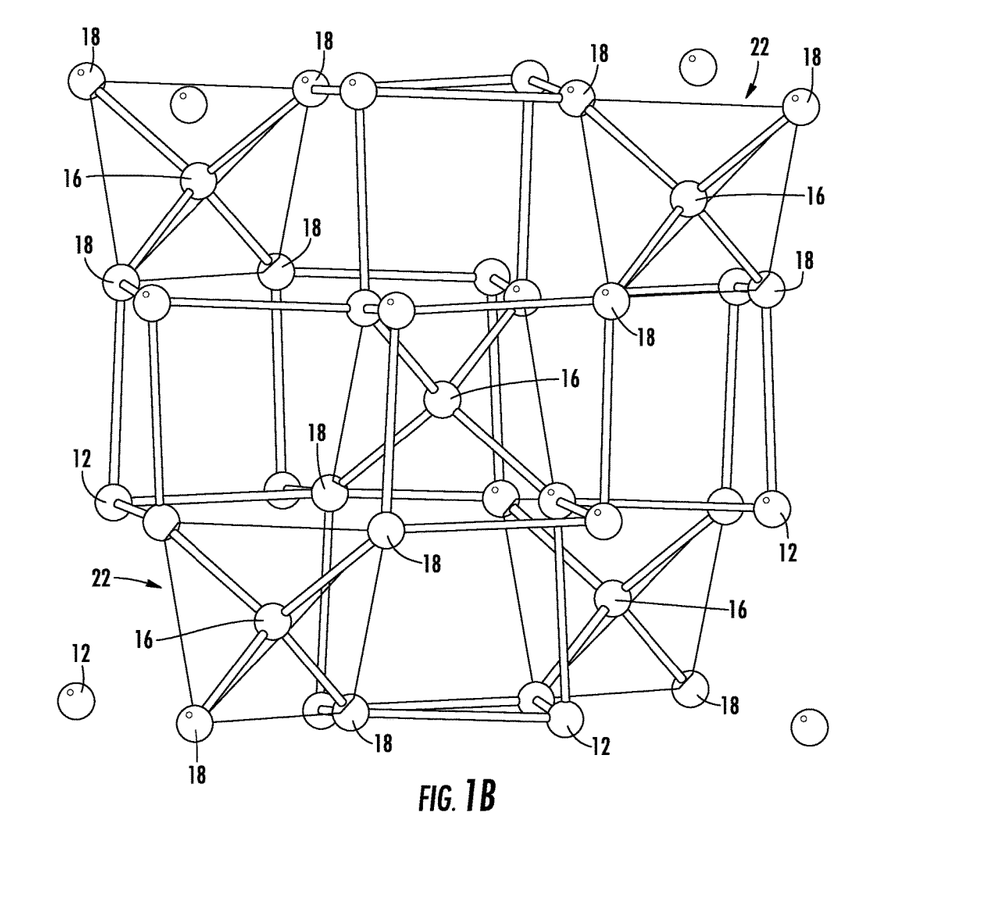

As shown in FIG. 1A and 1B, the structure of $Na_3WO_4F$ is best described as an anti-perovskite structure 10 $(WO_4)FNa_3$, where the F ions 20 are in the center of an $FNa_6$ octahedron 24 formed with the Na cations 12, 14 and face-sharing $FNa_6$ octahedra columns are stacked in a hexagonal closest packing parallel to the a-axis. The isolated $WO_4^{2-}$ tetrahedra 22 are formed by the W ions 16 and the O ions 18, and occupy the pores between the $FNa_6$ octahedron 24. As such, there are two distinct Na cation sites 12 and 14.

These $WO_4$ tetrahedra are, as outlines above, important structural units and necessary for scintillation and photoluminescence. As explained in greater detail below, the tungsten in these $MO_4^{n-}$ units can be partially substituted with B, Al, Si, P, S, Cr, V, Nb, Ta, Zr, Hf, Sc, Y, La, Ga, Ge, In, Mo, or combinations thereof. In certain embodiments, for example, the tungsten in these $MO_4^{n-}$ units can be partially substituted with Mo, In, Cr, Ge, Ga, and/or Al.

In these $MO_4^{n-}$ subunits of members of the family of ordered oxyfluorides $(MO_4)FA_nB_m$, where M is B, Al, Si, P, S, Cr, V, Nb, Ta, Zr, Hf, Sc, Y, La, Ga, Ge, W, In, Mo, or combinations thereof and A and B are independently alkali and/or alkaline earth metals, ligand-to-metal charge transfers are facilitated where an electron is transferred from an oxygen based molecular orbital (MO) to the metal-based one. Increasing the oxidation state of M effectively increases its electronegativity and thus lowers the energy of this HOMO-LUMO gap. As one reduces the charge on $M^{n+}$ one increases the Lewis base character of the tetrahedral unit. As one moves down a d-transition metal group $CrO_4^{2-} \rightarrow MoO_4^{2-} \rightarrow WO_4^{2-}$ one increases the gap energy (3.3, 5.3 and 6.2 eV respectively) since the relative sizes of the d-orbitals increase. Another way of describing this is that the Lewis base character increases. A strong Lewis base will impact the electronic environment of activators such as $Eu^{3+}$ in its vicinity. With the chemical diversity of available $MO_4^{n-}$ tetrahedrons that can be accommodated in these materials an exquisite control of PL properties is within reach. (See also, U.S. Publication No. 2009/0302236 of Vogt, et al. and U.S. Publication No. 2009/0174310 of Vogt, et al.; both of which are incorporated by reference herein).

2. Derivatives of $Na_3(WO_4)F$

Defects in the cation sublattice can be introduced into $Na_3WO_4F$ by substitution of two sodium ions ($Na^+$) with an alkali, an alkaline earth metal, a rare earth metal, and/or lanthanide activators such as $Eu^{2+}$. Additionally, a partial substitution of $W^{4+}$ by $Ga^{3+}$ and $In^{3+}$ subsequently allows the substitution of $A^{2+}$ and $A^{3+}$ ions on the A-site of this $A_nFMO_4$ family of materials within this host lattice.

In one embodiment, for example, the composition can be represented according to the formula:

$$Na^+{}_{3-a-2b-3c}A^+{}_aB^{2+}{}_bC^{3+}{}_cW_{1-x}M_xO_4F,$$

where $A^+$ is an alkali metal ion (e.g., $Li^+$, $K^+$, and/or $Rb^+$), $0 \leq a \leq 2$; $B^{2+}$ is cation having a +2 charge, such as an alkaline earth metal ion selected from $Be^{2+}$, $Mg^{2+}$, $Ca^{2+}$, $Sr^{2+}$, and/or $Ba^{2+}$, a rare earth divalent cation from the atomic numbers 57-71 (i.e., the lanthanoid series including the fifteen elements with atomic numbers 57 through 71: La, Ce, Pr, Nd, Pm, Sm, Eu, Gd, Tb, Dy, Ho, Er, Tm, Yb, and Lu), an activator divalent cation of Cr, Mn, Re, Cu, Ag, Au, Zn, Cd, Hg, Sn, and/or any combinations thereof; $0 \leq b \leq 1$; C is a is cation having a +3 charge, such as a rare earth trivalent cation from the atomic numbers 57-71 (i.e., the lanthanoid series including the fifteen elements with atomic numbers 57 through 71: La, Ce, Pr, Nd, Pm, Sm, Eu, Gd, Tb, Dy, Ho, Er, Tm, Yb, and Lu), an activator trivalent cation of Ac, U, Cr, Mn, As, Sb, Bi, In, Tl, and/or any combinations thereof; $0 \leq c \leq 1$; M is B, Al, Si, P, S, Cr, V, Nb, Ta, Zr, Hf, Sc, Y, La, Ga, Ge, In, Mo, or combinations thereof; and $0 \leq x \leq 0.2$.

For example, the compound can be rare earth doped such as having the formula $Na_{3-3c}Ce_cW_{1-x}Mo_xO_4F$, where $0<c \leq 0.1$ and $0 \leq x<0.2$ (e.g., $Na_{2.85}Ce_{0.05}WO_4F$) or $Na_{3-3c}Eu_cW_{1-x}Mo_xO_4F$, where $0<c \leq 0.1$ and $0 \leq x<0.2$ (e.g., $Na_{2.85}Eu_{0.05}WO_4F$).

As stated, dopants can also be included into the $Na_3WO_4F$. For example, in one embodiment, the tungsten atoms can be replaced by other metals in the structure, such as represented by the formula: $Na_3(W_{1-x}M_xO_4)F$, where $0<x \leq 0.2$ and M is B, Al, Si, P, S, Cr, V, Nb, Ta, Zr, Hf, Sc, Y, La, Ga, Ge, In, Mo, or combinations thereof.

For example, the parent compound $FA_nB_m(MO_4)$ with A=B=Na, n is 1, m is 2, and M is W (i.e., $FNa_3(WO_4)$) can be modified by aliovalent substitution with A being Li, K, Rb, Cs or combinations thereof and/or with $MO_4^{2-}$ entities such as M being Mo, W or combinations thereof. In addition or in the alternative, high-Z $MO_4^{3-}$ (where M is Nb, Ta or combinations thereof) can be substituted where A is Li, Na, K, Rb, Cs or combinations thereof, n=2, B is Ca, Sr, Ba or combinations thereof, and m=1. If $MO_4^{4-}$ entities are used (where M is Zr, Hf or combinations thereof), then A is Li, Na, K, Rb, Cs or combinations thereof, n=1, B is Ca, Sr, Ba, or combinations thereof, and m=2. If $MO_4^{5-}$ units with M being Y, La or combinations thereof are used, then n=0, B is Ca, Sr, Ba or combinations thereof, and m is 3.

As stated, this material is part of an even larger family of ordered oxyfluorides $(MO_4)FA_nB_m$, where M is B, Al, Si, P, S, Cr, V, Nb, Ta, Zr, Hf, Sc, Y, La, Ga, Ge, W, In, Mo, or combinations thereof and A and B are independently alkali and/or alkaline earth metals, that are best described as anti-perovskites such as $Sr_3AlO_4F$ and others, which have found applications in lighting and as optical host lattices. For example, U.S. Publication Nos. 2009/0302236 and 2009/0174310 of Vogt, et al. describe such structures and are incorporated by reference herein.

Figure 5A:
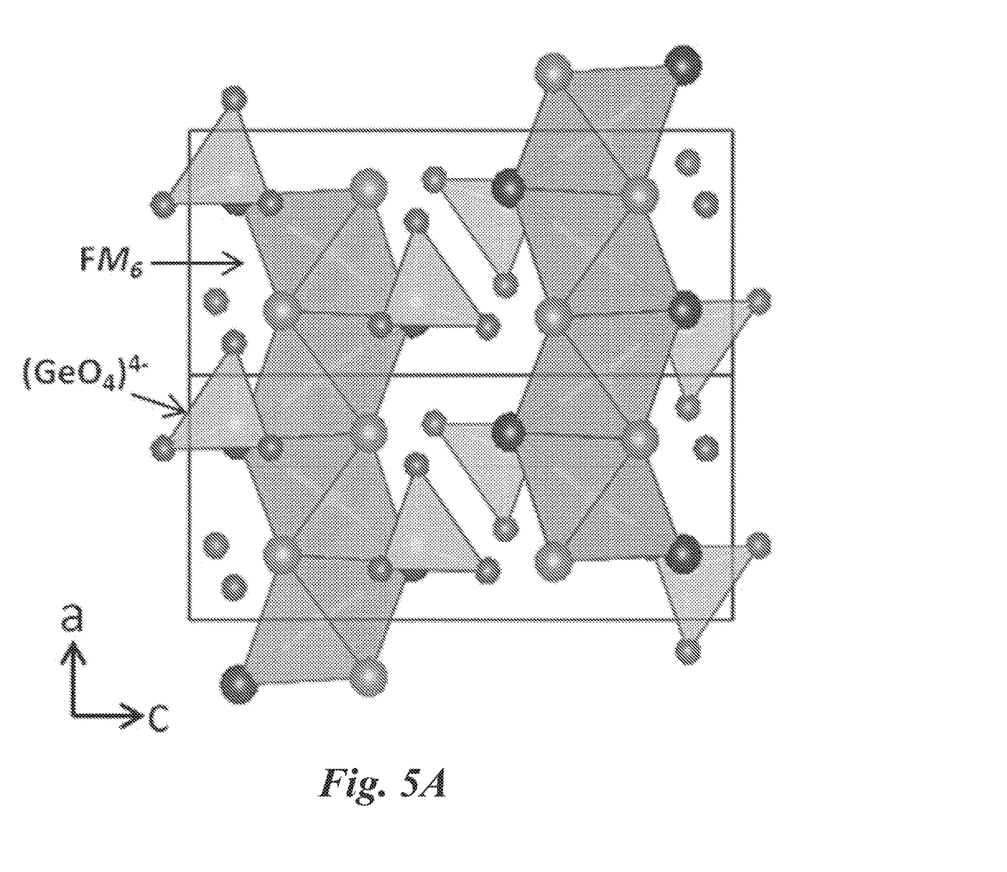
FIG. 5A shows an ac-plane projection of $Na_3(GeO_4)F$, which is essentially the same structure as in FIGS. 1A and 1B except for containing $GeO_4$ tetrahedra instead of $WO_4$ tetrahedra.
Figure 5B:
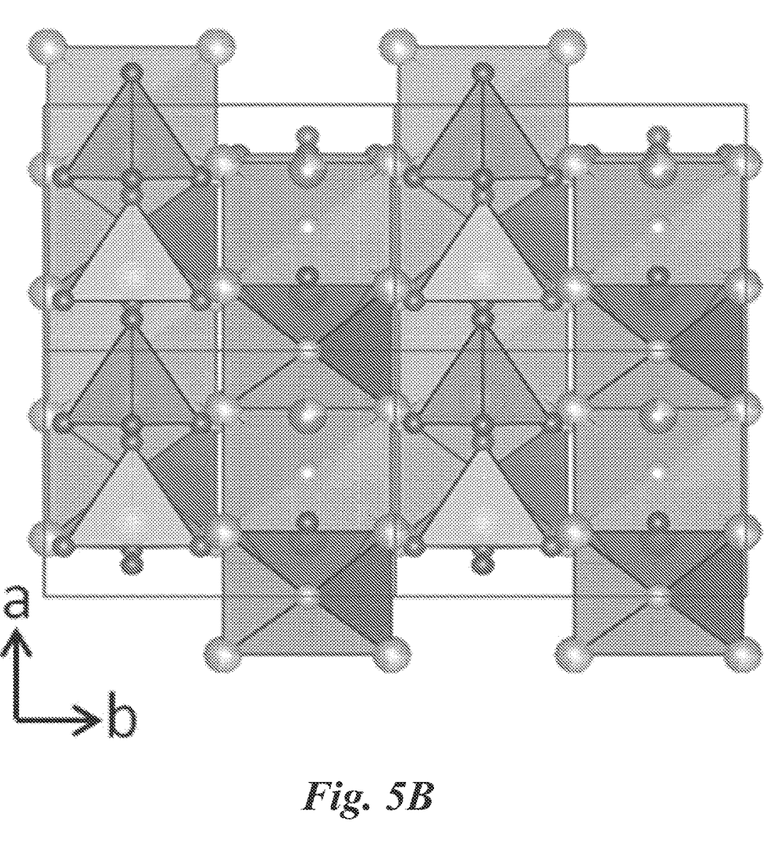
FIG. 5B shows an ab plane projection of the $Na_3(GeO_4)F$ structure shown in FIG. 5A.

FIGS. 5A and 5B show, respectively, the ac-plane and the ab plane projections of $Na_3(GeO_4)F$, which is essentially the same structure as in FIGS. 1A and 1B except for containing $GeO_4$ tetrahedra instead of $WO_4$ tetrahedra. Such a structure, along with its derivatives, can be prepared according to any discussion herein by substituting Ge for W.

3. Direct Synthesis Method

A direct synthesis method can be utilized to form the materials (e.g., $Na_3(W_{1-x}M_xO_4)F$, where $0 \leq x \leq 0.2$ and M is B, Al, Si, P, S, Cr, V, Nb, Ta, Zr, Hf, Sc, Y, La, Ga, Ge, In, Mo, or combinations thereof. In one embodiment, the method can involve the following reaction in an inert atmosphere (e.g., argon) and at elevated temperatures (e.g., about 950° C. to about 1400° C.):

$$(1-x)Na_2[WO_4] \cdot 2H_2O + xNa_2[MO_4] \cdot H_2O + NaF \rightarrow Na_3W_{1-x}M_xO_4F$$

where $0 > x \leq 0.2$ and M is B, Al, Si, P, S, Cr, V, Nb, Ta, Zr, Hf, Sc, Y, La, Ga, Ge, In, Mo, or combinations thereof. In one particular embodiment, x is greater than 0 but less than or equal to 0.2 (i.e., $0 < x \leq 0.2$). One particularly suitable compounds that can be formed from this method is $Na_3W_{1-x}Mo_xO_4F$, where $0 < x \leq 0.2$ (i.e., where M is Mo).

For example, direct synthesis methods of $Na_3(WO_4)F$ (i.e., where x is 0 in the formula shown above) can be achieved by reacting $Na_2(WO_4) \cdot 2H_2O$ with NaF in an inert atmosphere (e.g., argon) and at elevated temperatures (e.g., about 950° C. to about 1400° C.). In one particular embodiment, the components of the material are added in stoichiometric amounts. Due to this direct synthesis method, the $Na_3WO_4F$ material can be formed into single crystals having controllable purity, with impurity concentrations in the parts-per-billion (ppb) scale (e.g., impurities are present at a concentration of less than about 500 ppb, such as less than about 100 ppb).

Example 1

Figure 2:
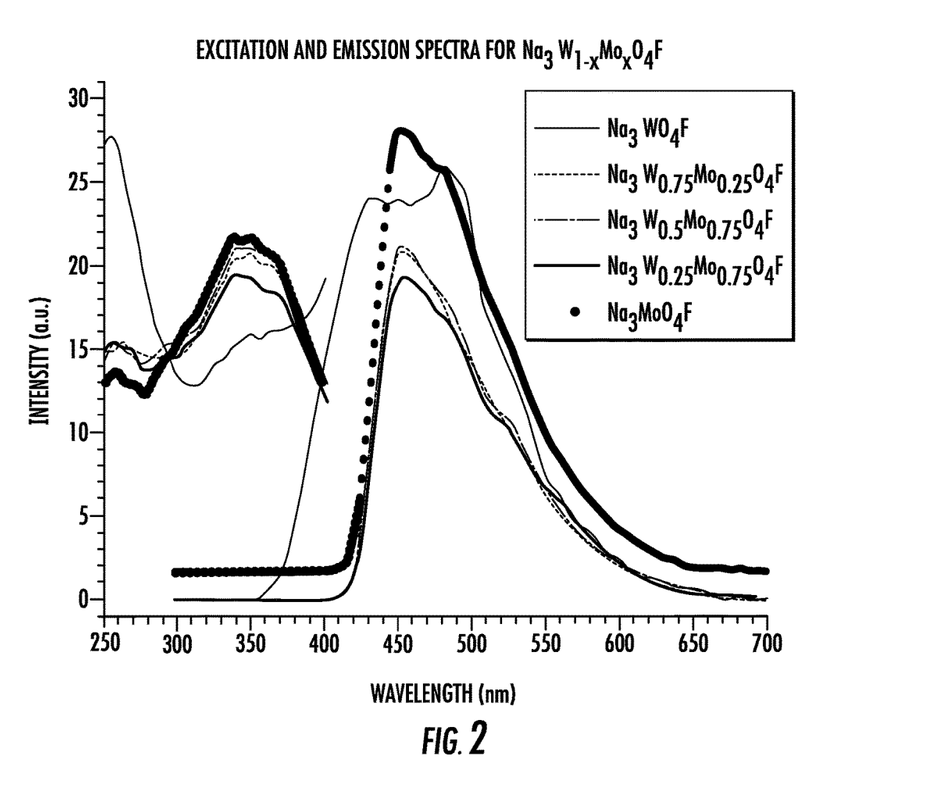
FIG. 2 shows the excitation and emission spectra for several compositions formed according to the formula $Na_3W_{1-x}Mo_xO_4F$, where x is 0, 0.25, 0.5, 0.75, and 1.

Compounds were prepared via the direct synthesis method described above to have the formulas: $Na_3W_{1-x}Mo_xO_4F$, where x is 0, 0.25, 0.5, 0.75, and 1. FIG. 2 shows the excitation and emission spectra for these compounds.

Example 2

Figure 3:
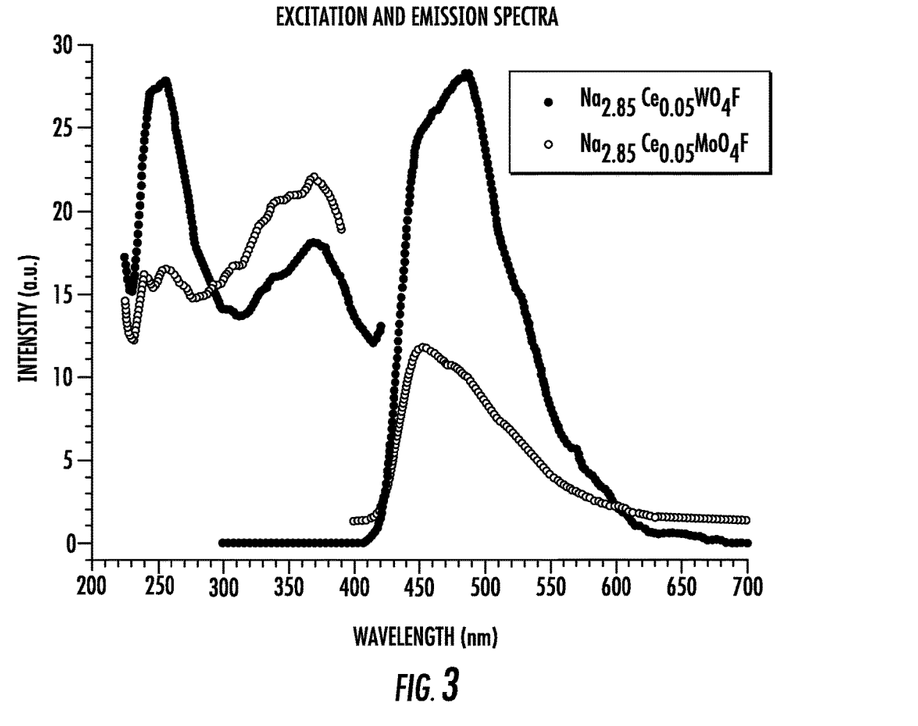
FIG. 3 shows the excitation and emission spectra for several compositions formed according to the formula $Na_{3-3c}Ce_cW_{1-x}Mo_xO_4F$ where c is 0.05 and where x is 0 and 1.

Two compounds were prepared via the direct synthesis method described above to have the formulas: (1) $Na_{2.85}Eu_{0.05}WO_4F$ and (2) $Na_{2.85}Eu_{0.05}MoO_4F$. FIG. 3 shows the excitation and emission spectra for these compounds.

Example 3

Figure 4:
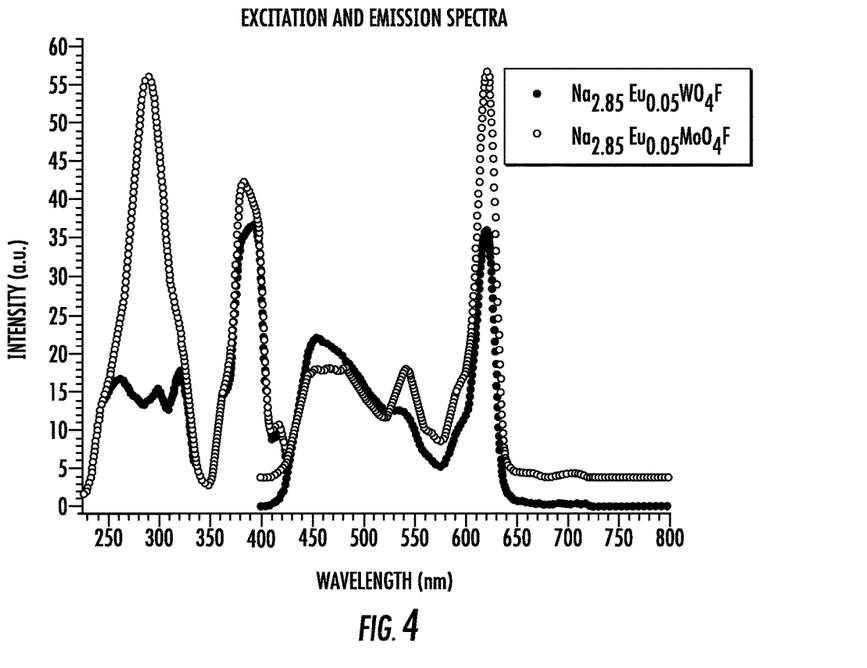
FIG. 4 shows the excitation and emission spectra for several compositions formed according to the formula $Na_{3-3c}Eu_cW_{1-x}Mo_xO_4F$ where c is 0.05 and where x is 0 and 1.

Two compounds were prepared via the direct synthesis method described above to have the formulas: (1) $Na_{2.85}Eu_0$ $_{0.5}$WO$_4$F and (2) Na$_{2.85}$Eu$_{0.05}$MoO$_4$F. FIG. 4 shows the excitation and emission spectra for these compounds.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed is:

1. A direct synthesis method, comprising:
reacting Na$_2$(WO$_4$)·2H$_2$O with NaF in an inert atmosphere at a reaction temperature of about 950° C. to about 1400° C.

2. A direct synthesis method, comprising:
reacting Na$_2$(WO$_4$)·2H$_2$O with NaF and Na$_2$[MO$_4$]·H$_2$O in an inert atmosphere at a reaction temperature of about 950° C. to about 1400° C. according to the reaction:

$$(1-x)Na_2[WO_4]\cdot 2H_2O + xNa_2[MO_4]\cdot H_2O + NaF \rightarrow Na_3W_{1-x}M_xO_4F$$

where
0≤x≤0.2; and
M is B, Al, Si, P, S, Cr, V, Nb, Ta, Zr, Hf, Sc, Y, La, Ga, Ge, In, Mo, or combinations thereof.

3. The method as in claim 2, wherein x is 0 such that Na$_3$(WO$_4$)F is formed.

4. The method as in claim 3, wherein Na$_3$WO$_4$F is formed into single crystals having an impurity concentration present at a concentration of less than about 500 ppb.

5. The method as in claim 2, wherein 0<x≤0.2.

6. The method as in claim 5, wherein M is Mo such that Na$_3$W$_{1-x}$Mo$_x$O$_4$F is formed.

7. A crystal structure comprising: Na$_3$(WO$_4$)F with impurities present in a concentration of less than about 500 ppb.

8. The crystal structure as in claim 7, wherein impurities are present in concentration of less than about 100 ppb.

9. A scintillator material comprising the crystal structure of claim 7.

10. A phosphor material comprising the crystal structure of claim 7.

11. A composition of matter having the formula:

$$Na^+{}_{3-a-2b-3c}A^+{}_aB^{2+}{}_bC^{3+}{}_cW_{1-x}M_xO_4F$$

where
0≤a≤2;
A$^+$ is an alkali metal ion;
0≤b≤1;
B$^{2+}$ is an alkaline earth metal ion selected from Be$^{2+}$, Mg$^{2+}$, Ca$^{2+}$, Sr$^{2+}$, and/or Ba$^{2+}$, a rare earth divalent cation from the atomic numbers 57-71, an activator divalent cation of Cr, Mn, Re, Cu, Ag, Au, Zn, Cd, Hg, Sn, or any combinations thereof;
0≤c≤1;
C$^{3+}$ is a rare earth trivalent cation from the atomic numbers 57-71, an activator trivalent cation of Ac, U, Cr, Mn, As, Sb, Bi, In, Tl, or any combinations thereof;
0<x≤0.2; and
M is B, Al, Si, P, S, Cr, V, Nb, Ta, Zr, Hf, Sc, Y, La, Ga, Ge, In, Mo, or combinations thereof.

12. The composition of matter as in claim 11, where a=b=c=0 such that the composition of matter has the formula:

$$Na_3(W_{1-x}M_xO_4)F,$$

where
0<x≤0.2, and
M is B, Al, SL P, S, Cr, V, Nb, Ta, Zr, Hf, Sc, Y, La, Ga, Ge, In, Mo, or combinations thereof.

13. The composition of matter as in claim 11, wherein M is Mo.

14. The composition of matter as in claim 11, wherein impurities are present in a concentration of less than 500 ppb.

15. A scintillator material comprising the composition of claim 11.

16. A phosphor material comprising the composition of claim 11.

17. A composition having the formula:

$$Na^+{}_{3-a-2b-3c}A^+{}_aB^{2+}{}_bC^{3+}{}_cW_{1-x}M_xO_4F$$

where
a is 0;
A$^+$ is an alkali metal on;
b is 0;
B$^{2+}$ is an alkaline earth metal ion selected from Be$^{2+}$, Mg$^{2+}$, Ca$^{2+}$, Sr$^{2+}$, and/or Ba$^{2+}$, a rare earth divalent cation from the atomic numbers 57-71, an activator divalent cation of Cr, Mn, Re, Cu, Ag, Au, Zn, Cd, Hg, Sn, or any combinations thereof;
0<c≤0.1;
C is Ce, Eu, or a combination thereof;
0≤x<0.2; and
M is B, Al, Si, P, S, Cr, V, Nb, Ta, Zr, Hf, Sc, Y, La, Ga, Ge, In, Mo, or combinations thereof.

18. A crystal structure comprising: Na$_3$(GeO$_4$)F with impurities present in a concentration of less than about 500 ppb.

* * * * *